Oct. 5, 1926.

H. KINVALL 1,601,917

THREE-WHEELED MOTOR VEHICLE

Filed Oct. 9, 1925

Hjalmar Kinvall
by
Karl Viertel

Patented Oct. 5, 1926.

1,601,917

UNITED STATES PATENT OFFICE.

HJALMAR KINVALL, OF LEIPZIG-STOETTERITZ, GERMANY.

THREE-WHEELED MOTOR VEHICLE.

Application filed October 9, 1925, Serial No. 61,611, and in Germany May 1, 1925.

My invention relates to small motor vehicles of the three wheeled type in which the front wheel is driven and serves as steering wheel.

The object of my invention is to provide a small car of this type having a collapsible body which can be folded into a relatively small compass for storage.

Another object of my invention is to so design the collapsible body of the car that two persons can be comfortably seated when in operative position and that even a third passenger or a fairly large bag or trunk may be carried along.

Another object of my invention is to provide a small car of the type specified above which is simple and rigid in its construction, which can be produced at a low price, and which will stand heavy wear more particularly as far as the joints, pivots, hinges and like members of the collapsible body are concerned.

With these and other objects in view I have invented a small car the essential features of which are briefly specified in the annexed claims. The nature and scope of my invention will be more fully understood from the following specification taken together with the accompanying drawing in which—

Figure 1:
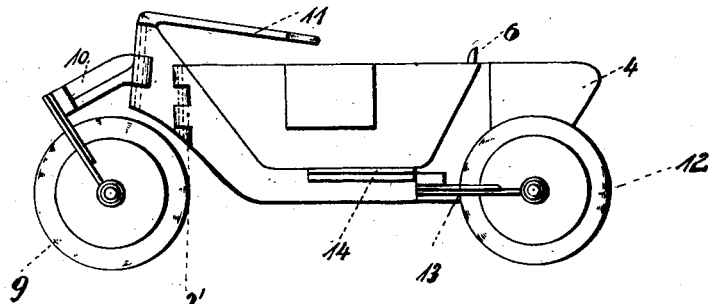
Fig. 1 is a side view of a car shown by way of example.

According to my invention the side panels 1 and 2 of the body frame are hinged together at 2' and are preferably of angular or curved shape. It will be noted that in the form of the invention shown in Figs. 1 to 3, the hinge 2' is located some little distance apart from the front corner of the body. Said corner portion is rigidly connected with and forms a part of the panel 2.

The front corner of the body is supported by the driving and steering wheel 9, the latter being pivotally connected therewith through the carrier 10 for the motor (not shown) and being controlled by the steering handle 11.

The side panels 1 and 2 are provided with footboards 14 and with extensions 13 carrying the rear wheels 12.

Figure 2:
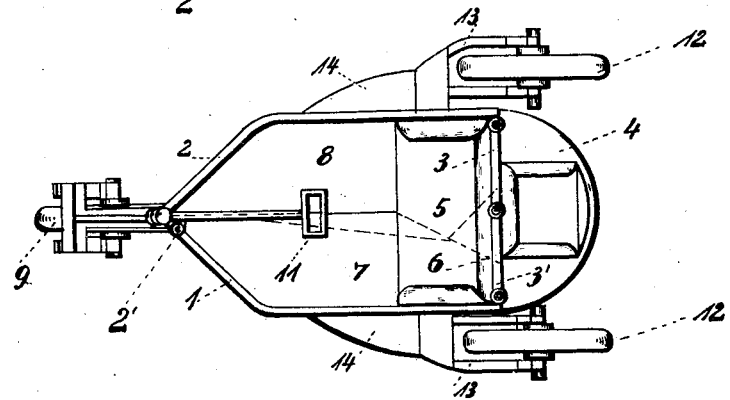
Fig. 2 is a plan view of the car, the body of which is in operative position.
Figure 3:
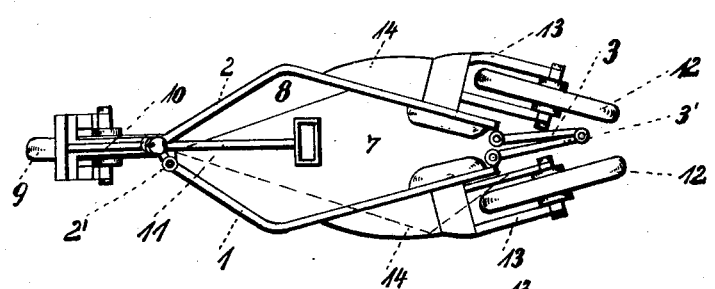
Fig. 3 is another plan view showing the car with its body folded up.

As seen in Figs. 2 and 3 the side panels 1 and 2 are linked together by the rear panel formed in two parts 3, 3' which are interconnected by hinges or like pivotal joints.

The side and rear panels 1, 2, 3 are kept in their unfolded operative position—shown in Fig. 2—by means of the seat 5 and its back 6, both the latter being removably arranged so as to easily be taken out and stored within the folded up car body.

7 and 8 designate the bottom boards of the car body rigidly connected with the side panels 1 and 2 respectively. Said bottom boards 7 and 8 are arranged so as to partly overlap each other at their middle portion (see Fig. 2) and to lie one on top of the other, when in folded position according to Fig. 3.

When folded up into its compact form, the width of the whole car is only about one half of the car unfolded, thus presenting the advantage of storing the car in narrow quarters.

According to this invention I further provide an emergency seat or carrier 4, which can be attached to the rear 3 of the car body and is adapted to seat a third person or to hold a fairly large amount of luggage, e. g. a trunk, hand bags and the like.

In order to comfortably seat the companion at the rear and to provide sufficient space wherein to put his legs, the rear panel boards are appropriately shaped and formed with recessed portions (not shown).

When the car is to be folded up the emergency seat 4 is detached and carried on top of the collapsed body.

Figure 4:
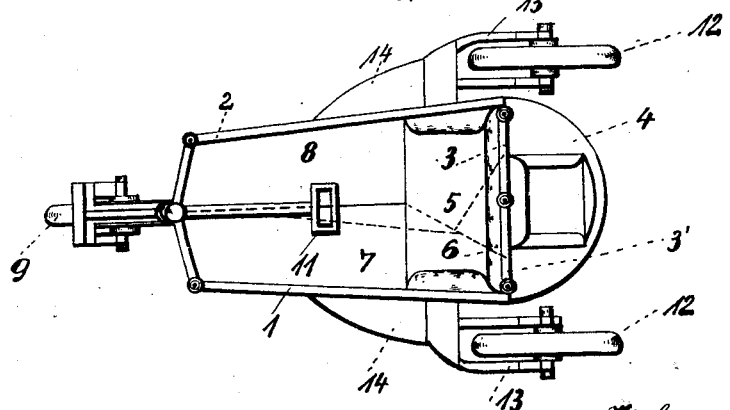
Fig. 4 shows a modified body structure of the car in operative position.

In the form shown in Figs. 1–3 the motor is supposed to be carried on the frame 10 of the front wheel 9. Fig. 4 is a modification of a collapsible car according to this invention in which the body structure is designed so as to provide inside of the body proper sufficient space also for the motor. In this modified form the side panels 1 and 2 are hinged to a relatively wide front or corner piece as indicated in the drawing, but the width of said corner piece should not exceed the width of the unfolded car.

In this case the side panels should be made straight or of only slightly bent form while the remaining parts of which the car body is composed are substantially identical in their function and design to those specified above in connection with the embodiment of my invention shown in Figs. 1–3.

Instead of one single driving wheel two wheels may be conveniently arranged at the front of the vehicle at a distance from each other which is preferably about half of the wheel base of the rear wheels 12.

Other changes may be made in regard to the form and the arrangement of the various parts of my collapsible car without materially deviating from the spirit and the main ideas of my invention.

What I claim is:

1. A front driven three wheeled motor car having a collapsible body structure, the latter comprising two side panes one on each side of the body, a rear panel, bottom boards rigidly attached to the side panels, and means for folding said panels and boards together into a small compass.

2. A front driven three wheeled motor vehicle having a collapsible body structure, the latter comprising two side panels hinged for relative movement about the front of the body, a rear panel attached to both side panels at the rear and adapted to be folded, and a bottom board rigidly attached to each side panel.

3. A front driven three wheeled motor vehicle having a collapsible body structure, the latter comprising two side panels hinged for relative movement about the front of the body, a rear panel attached to both side panels at the rear and adapted to be folded, and a bottom board rigidly attached to each side panel, said bottom boards partly overlapping each other along the center line of the body.

4. A front driven three wheeled motor vehicle having a collapsible body structure, the latter comprising two side panels hinged for relative movement about the front of the body, a rear panel attached to both side panels at the rear and adapted to be folded, and a bottom board rigidly attached to each side panel, a seat and a back thereto removably fixed between the side panels at the rear.

5. A front driven three wheeled motor vehicle having a collapsible body structure according to claim 1, characterized by side panels of angular shape having foot boards rigidly attached thereto.

6. A front driven three wheeled motor vehicle, having a collapsible body structure, according to claim 1, characterized by side panels of angular shape having foot boards rigidly attached thereto, the latter being provided with extensions at the rear and adapted to carry the rear wheels of the vehicle.

7. A front driven three wheeled motor vehicle, having a collapsible body structure, according to claim 1, characterized by an emergency carrier removably attached to the rear of the body structure and adapted to carry a person, luggage, etc.

8. A front driven three wheeled vehicle including sides, a bottom board carried by each side, means to connect the sides at their front parts for relatively hinging movement to permit of folding thereof, and means to connect the rear parts of the sides to hold same in extended position and to allow of said folding of the sides.

9. A front driven three wheeled vehicle, including angular sides hinged together at their front ends so as to be capable of being folded, a bottom board carried by each side and being relatively overlapped, and means to connect the rear end portions of the sides to hold the same in extended position and to allow of folding of the sides.

In testimony whereof I have signed my name to this specification.

HJALMAR KINVALL.